Patented Oct. 19, 1937

2,096,521

UNITED STATES PATENT OFFICE 2,096,521

ADHESIVE

Wilhelm Kraus and Willi Fisch, Basel, Switzerland, assignors to the firm of Society of Chemical Industry in Basle, Basel, Switzerland No Drawing. Application June 29, 1935, Serial No. 29,173. In Switzerland July 2, 1934

8 Claims. (Cl. 260—3)

The present invention is concerned with a stable water soluble glue preparation in dry form useful for the preparation of an adhesive capable of being hardened.

The new preparation consists in a mixture of an unhardenable urea-formaldehyde resin, an agent promoting hardening and a formaldehyde yielding compound.

In the copending specification Ser. No. 725,660 filed May 14, 1934, now Patent No. 2,033,718, there is described a process for the manufacture of non-hardening condensation products wherein urea, formaldehyde and hexamethylenetetramine are caused to react with each other in such proportions that there are present for each molecule of hexamethylenetetramine not more than 10 molecules of urea and for each molecule of urea a proportion of formaldehyde ranging substantially between 1 and 2 molecules.

In the copending specification Ser. No. 699,463, filed Nov. 23, 1933, now Patent No. 2,077,841, Example 9, lines 1–7, Example 10, first paragraph, it is shown that such condensations products incapable of being hardened can be converted into a form capable of being hardened by further addition of urea and formaldehyde or of condensation products of urea and formaldehyde.

In the copending specification Ser. No. 21,683, filed May 15, 1935, there is described a process of converting condensation products of urea and formaldehyde inacapable of being hardened into condensation products capable of being hardened, wherein the condensation products being incapable of being hardened are treated with formaldehyde. As non-hardening condensation products of urea and formaldehyde especially useful for the purpose of said copending specification there are mentioned those made from 1 molecular proportion of urea and less than 1 molecular proportion of formaldehyde in presence of less than 0.1 molecular proportion of hexamethylenetetramine.

It has now been found that non-hardening urea-formaldehyde condensation products of the above outlined or similar kind are especially suitable for making stable glue preparations in dry form, when combined with a hardened catalyst and a formaldehyde yielding agent.

Hitherto glue preparations on the basis of urea-formaldehyde condensation products have been made exclusively with hardenable condensation products, these latter having been marketed in form of aqueous solutions to which before use an acid hardening catalyst was added.

These products, however, are associated with a number of disadvantages. Even without the addition of an acid substance the aqueous solutions are not stable, so that after a relatively short time they become unserviceable owing to hardening. Furthermore since they contain relatively large quantities of water their transport is unnecessarily expensive and their storage is inconvenient. Also, in many cases, the application of the correct quantities of the hardening agent is difficult in inexperienced hands.

The application of an acid catalyst has proved indispensable in adapting urea-formaldehyde condensation products for use in sticking, in order to reduce the time of hardening of the pure condensation product to such a degree that the sticking operation can be performed at a low temperature, preferably at about 70 to 100° C. Of course the solutions of hardenable condensation products after admixture with the hardening agents can no longer be stored; it remains liquid only for a short time and then sets to a hard cake. Sticking must, of course, be performed in the period during which the material is still liquid, just as in the case of a cold glue.

The sticking or glueing preparations used in accordance with the invention have the remarkable property that they contain a condensation product which does not harden and contains the accelerator necessary for sticking without, however, undergoing any alteration. Only by the addition of a further quantity of a substance yielding formaldehyde, such as formaldehyde itself or a mixture of formaldehyde and urea or a urea-formaldehyde condensation product containing formaldehyde which can be split off, are these non-hardening condensation products rendered capable of undergoing hardening and thus acting as hardening glues. The invention thus makes use of non-hardening condensation products containing catalysts which yield glues which harden only after dissolution in water in presence of a substance which yields formaldehyde. It is fundamentally of no consequence whether the substance yielding formaldehyde is contained in the dry mixture and becomes active owing to the dissolution of the preparation or whether these hardening agents are added to a solution of the non-hardening condensation products only just before use for sticking. In the first case there are obtained dry preparations which have a much better stability than the aqueous urea-formaldehyde condensation products; in the latter case the stability of the dry preparations is practically unlimited.

The following methods are possible for preparing stable gluing preparations in dry form, the non-hardening condensation products containing a catalyst used in accordance with the invention being designated as primary products and the additions containing formaldehyde being designated as secondary products. The quantitative proportions of the ingredients are advantageously such that the final product contains about 1 molecular proportion of carbamide to 1.5 molecular proportions of formaldehyde.

A.—The dry primary product and dry para-formaldehyde are mixed together to form a preparation which is ready for use when dissolved in water. In this case the total quantity of the carbamide (urea, thiourea or the like) is contained in the primary product, together with the catalyst and such a small proportion of formaldehyde that no hardening can occur. The formaldehyde required for hardening is present in the dry state and becomes active only after dissolution in water.

B.—The dry primary product, the dry carbamide and dry para-formaldehyde are mixed together. This mixture also yields a hardening glue on dissolution in water. In this case the primary product containing a catalyst is mechanically mixed with unchanged carbamide and the quantity of formaldehyde required for hardening; only in aqueous solution do these components react to give a product which is capable of undergoing hardening.

C.—The dry primary product is mechanically mixed with a dry secondary product containing available formaldehyde. In this case the secondary product may be a condensation product capable of being hardened from urea, thiourea or the like and formaldehyde, for instance a condensation product made from 2 molecular proportions of formaldehyde and 1 molecular proportion of urea, or it may be some other product containing formaldehyde, such as a phenol-formaldehyde condensation product containing formaldehyde which can be split off. In this case the secondary product would naturally have a low stability if it were subject to the action of the accelerator. However, the accelerator can become active only after it has been liberated from its admixture with the primary product of dissolution. This method therefore gives stable dry preparations in which the catalyst can exert its action in causing hardening only when the preparation has been dissolved before use.

It is possible to vary the Methods A and B by omitting the para-formaldehyde from the dry preparation and dissolving this in the necessary quantity of aqueous formaldehyde instead of in water alone. The preparation thus contains, in the case of Method A, only the primary product and in the case of Method B the primary product together with urea or thiourea, that is to say in both cases products of unlimited stability to which the formaldehyde required for hardening is added only when the preparation is dissolved preparatory to gluing.

If desired there may be added to the glue, besides urea or its derivatives, other substances which are capable of forming condensation products with formaldehyde. As such products may be mentioned, for example, phenols, urethane, aniline and so on. Further natural or synthetic colloids, such as animal glue, starch, cellulose ethers or the like may also be incorporated in the glue.

As hardening accelerators there may be used inorganic or organic acids such as for instance sulfuric acid, oxalic acid or compounds yielding acids, such as, for instance, ammonium-sulfate, ammonium chloride, and so on.

The term "formaldehyde yielding compound" is meant to include formaldehyde itself as well as polymers of formaldehyde or condensation products of formaldehyde capable of yielding formaldehyde, such as carbamide-formaldehyde condensation products containing available formaldehyde.

The following examples illustrate the invention, the parts being by weight:—

Example 1 (Case A)

540 parts of urea (9 mols) and 228 parts of thiourea (3 mols) are dissolved in 1160 parts of formaldehyde of 30 per cent strength by weight (11.6 mols) and 171 parts of ammonia of 25 per cent strength by weight (2.5 mols yielding with 3.78 mols formaldehyde 0.63 mol. hexamethylenetetramine). In the course of 2 hours about 1000 parts of water are expelled from the solution by distillation under reduced pressure at about 60° C. and the dry product thus obtained is ground together with 3.5 per cent of ammonium sulfate. The mixture thus obtained constitutes a stable dry preparation.

In order to prepare a solution for use as a glue 21 parts of this mixture are dissolved in 16 parts of formaldehyde of 37 per cent strength by weight to which has advantageously been added 10 per cent of starch as a thickener.

For preparing a veneered wood plate the surface to be covered with the veneer is coated with this glue, which is easily applied by brushing, there being used, for example, 200–300 grams per sq. m. of surface. After superficial drying the veneer is applied and the whole is subjected in a press in the usual manner to a pressure of about 10 kilos per sq. cm. at a temperature of 100° C. for ¼ hour. There is obtained a veneer which adheres well to the wooden foundation plate.

Example 2 (Case B)

A product which does not harden and contains a catalyst is made as follows: 11.2 parts of hexamethylenetetramine (0.08 mol.) and 24 parts of urea (0.4 mol.) are dissolved in 20 parts of formaldehyde of 30 per cent strength by weight (0.2 mol.) and the soltuion is heated to 60° C. There is then introduced in portions in the course of 1½ hours a quantity of sulfuric acid of 33 per cent strength by weight amounting in all to 0.9 part. After a total period of 1¾ hours the solution is cooled and then evaporated to dryness at 60° C. under reduced pressure. The product remains in the form of a hard, brittle foam which can be very easily ground (I).

1 part of product I is mixed with 1¼ parts of urea and 1¼ parts of para-formaldehyde, the mixture constituting a stable, dry glue powder. For use 1 part of this mixture is dissolved in 1 part of an aqueous, highly viscous starch solution of 10 per cent strength and the solution is used directly for gluing.

If the mixture is dissolved in water instead of in a starch solution there must be used a solution of higher concentration and this should advantageously be allowed to stand for some time in order to attain the desired viscosity.

In either case the gluing operation is performed analogously to that described in Example 1.

Example 3 (Case C)

The primary product I is prepared as described in Example 2.

A secondary product containing formaldehyde which can be split off is made in the following manner: 60 parts of urea (1 mol.) are dissolved in 200 parts of formaldehyde of 30 per cent strength by weight (2 mols) and the solution is neutralized and heated at about 100° C. for 3–4 hours in a closed autoclave. It is then evaporated to dryness under reduced pressure as above described and the foam-like product is powdered (II).

In order to prepare a stable product for use as a glue 1 part of product I is mixed with 2.1 parts of product II. The mixture so obtained (III) is very easily soluble and can be made into a glue solution of any desired viscosity simply by stirring with cold water.

700 parts of the glue III are stirred with 300 parts of cold water to produce a viscous solution of about the consistency of honey. The glue thus obtained is applied in known manner to a wood or veneer which is to be glued, in quantity of 80–120 grams per sq. m. It is then subjected in a press, whilst still moist or after drying in the air, to a pressure of 15 kilos per sq. cm. at a temperature of 95° C. for 15 minutes and is then removed from the press whilst still hot. There is obtained a well glued product whose adhesive strength may amount, for example, in the case of beech wood, to 50–80 kilos per sq. cm. The glue is very fast towards water.

*Example 4 (Case C)*

90 parts of urea (1½ mols), 47 parts of phenol (½ mol.) and 56 parts of hexamethylenetetramine (0.4 mol.) are dissolved in 81 parts of a formaldehyde solution of 37 per cent strength and the whole is heated for ½ hour at 60° C., during which period there is added in portions, the quantity of sulfuric acid of 33 per cent strength amounting in all to 30 parts. There is obtained a yellowish syrup having an alkaline reaction; it is evaporated to dryness under reduced pressure, yielding a foamy mass which can easily be powdered.

One part of this dry product is mixed with 2 parts of product II described in Example 3. The mixture gives, with water, the solution which can be used in known manner for gluing various kinds of wood.

*Example 5 (Case C)*

60 parts of urea (1 mol.) and 20 parts of hexamethylenetetramine (1/7 mol.) are dissolved in 91.5 parts of formaldehyde of 36 per cent strength (1.1 mols) and the whole is kept boiling for 1 hour in a reflux apparatus. Thereupon the solution is dried in a vacuum, then pulverized and mixed with 200 parts of the product II of Example 3 together with 2 parts of ammonium sulfate.

It is to be understood that various changes and modifications, as for instance changes in the proportions of the ingredients herein named may be made and come within the scope of the invention and of the appended claims in which we intend to claim all novelty permissible in view of the prior art.

What we claim is:—

1. A stable glue preparation in dry solid form useful for the production of an adhesive capable of being hardened, said preparation comprising a mixture of a dry solid non-heat-hardenable urea-formaldehyde resin, an acidic hardening-promoting agent, and a formaldehyde-yielding compound selected from the group consisting of formaldehyde, paraformaldehyde, and urea-formaldehyde condensation products containing available formaldehyde, said mixture being soluble in solvents consisting substantially of water and becoming reactive only in dissolved state, said resin being a condensation product obtained by condensing urea with formaldehyde in presence of hexamethylenetetramine.

2. A stable glue preparation as defined in claim 1, said non-heat-hardenable urea-formaldehyde resin being a condensation product obtained by condensing urea with formaldehyde in presence of a proportion of hexamethylenetetramine ranging from approximately 0.05 mol. to approximately 0.2 mol. for each mol. of urea.

3. A stable glue preparation as defined in claim 1, said non-heat-hardenable urea-formaldehyde resin being a condensation product obtained by condensing urea with a proportion of formaldehyde ranging from approximately 0.5 to approximately 1.1 mols for each mol. of urea in presence of a proportion of hexamethylenetetramine ranging from approximately 0.05 to approximately 0.2 mol. for each mol. of urea.

4. A stable glue preparation in dry solid form useful for the production of an adhesive capable of being hardened, said preparation comprising a mixture of a non-heat-hardenable urea-formaldehyde resin and an acidic hardening-promoting agent, said resin being a condensation product obtained by condensing urea with formaldehyde in presence of hexamethylenetetramine, said mixture being soluble in water and possessing the property of being transformed, when in dissolved state, into a hardened product by the addition of a formaldehyde-yielding compound selected from the group consisting of formaldehyde, paraformaldehyde, and urea-formaldehyde condensation products containing available formaldehyde.

5. A stable glue preparation in dry solid form useful for the production of an adhesive capable of being hardened, said preparation comprising a mixture of a dry solid non-heat-hardenable urea-formaldehyde resin, an acidic hardening-promoting agent, a compound selected from the group consisting of urea and thiourea, and a formaldehyde-yielding compound selected from the group consisting of formaldehyde, paraformaldehyde, and urea-formaldehyde condensation products containing available formaldehyde, said resin being a condensation product obtained by condensing urea with formaldehyde in presence of hexamethylenetetramine, said mixture being soluble in solvents consisting substantially of water and becoming reactive only in dissolved state.

6. A dry stable preparation of the character described useful for the production of an adhesive capable of being hardened, said preparation comprising a mixture of a dry solid non-heat-hardenable urea-formaldehyde resin, an acidic hardening-promoting agent, and a formaldehyde-yielding compound selected from the group consisting of formaldehyde, paraformaldehyde, and urea-formaldehyde condensation products containing available formaldehyde, said mixture being soluble in solvents consisting substantially of water and becoming reactive only in dissolved state, said resin being a condensation product obtained by condensing urea with formaldehyde in presence of hexamethylenetetramine, said preparation being admixed with additional formaldehyde-yielding substance just before use thereof to form the said adhesive.

7. A stable glue preparation in dry solid form useful for the production of an adhesive capable of being hardened, said preparation comprising a mixture of a dry solid non-heat-hardenable resin, an acidic hardening-promoting agent, and a formaldehyde-yielding compound selected from the group consisting of formaldehyde, paraformaldehyde, and urea-formaldehyde condensation products containing available formaldehyde, said mixture being soluble in solvents consisting substantially of water and becoming reactive only in dissolved state, said resin being a condensation product obtained by condensing a mixture of urea and a minor proportion of thiourea with formaldehyde in presence of hexamethylenetetramine.

8. A stable glue preparation in dry solid form useful for the production of an adhesive capable of being hardened, said preparation comprising a mixture of a dry solid non-heat-hardenable resin, an acidic hardening-promoting agent, and a formaldehyde-yielding compound selected from the group consisting of formaldehyde, paraformaldehyde, and urea-formaldehyde condensation products containing available formaldehyde, said mixture being soluble in solvents consisting substantially of water and becoming reactive only in dissolved state, said resin being a condensation product obtained by condensing a mixture of urea and a minor proportion of phenol with formaldehyde in presence of hexamethylenetetramine.

WILHELM KRAUS.
WILLI FISCH.